US010769225B2

(12) United States Patent
Brown

(10) Patent No.: US 10,769,225 B2
(45) Date of Patent: Sep. 8, 2020

(54) PROCESSOR-IMPLEMENTED METHOD, COMPUTING SYSTEM AND COMPUTER PROGRAM FOR INVOKING A SEARCH

(71) Applicant: Richard S. Brown, Thornhill (CA)

(72) Inventor: Richard S. Brown, Thornhill (CA)

( * ) Notice: Subject to any disclaimer, the term of this patent is extended or adjusted under 35 U.S.C. 154(b) by 0 days.

(21) Appl. No.: 16/039,462

(22) Filed: Jul. 19, 2018

(65) Prior Publication Data

US 2018/0322213 A1 Nov. 8, 2018

Related U.S. Application Data

(63) Continuation of application No. PCT/CA2017/050966, filed on Aug. 15, 2017.

(30) Foreign Application Priority Data

Aug. 15, 2016 (CA) ..................... 2939395

(51) Int. Cl.
*G06F 16/9535* (2019.01)
*G06F 16/248* (2019.01)
(Continued)

(52) U.S. Cl.
CPC .......... *G06F 16/9535* (2019.01); *G06F 9/547* (2013.01); *G06F 16/248* (2019.01);
(Continued)

(58) Field of Classification Search
CPC ......... G06F 17/30985; G06F 17/30637; G06F 17/30681; G06F 17/30864;
(Continued)

(56) References Cited

U.S. PATENT DOCUMENTS 6,016,516 A * 1/2000 Horikiri .................. G06F 9/547
  709/203
6,460,029 B1 * 10/2002 Fries .................. G06F 16/3329
(Continued)

FOREIGN PATENT DOCUMENTS

CN         101004737 A     7/2007
WO     WO-2013030133 A1 *  3/2013 ............. G06F 17/30

OTHER PUBLICATIONS

International Search Report for App. No. PCT/CA2017/050966 dated Nov. 21, 2017.
(Continued)

*Primary Examiner* — Jay A Morrison
*Assistant Examiner* — Antonio J Caiado
(74) *Attorney, Agent, or Firm* — Ralph E. Jocke; Colin P. Cochran; Walker & Jocke

(57) ABSTRACT

Provided herein is a processor-implemented method of creating a hyperlink from a text messaging text entry field in a text messaging app on a user's mobile device. The method includes assigning within the messaging app one or more keyboard characters as control characters respectively designating a start of a text search string and an end of a text search string; enabling the user to enter text including the control characters into the text messaging app text entry field; and upon the user activating a send command to send a text message that includes the start and end control characters defining the bounds of a search text string, displaying the search string as a hyperlinked text in the message thread selectable to invoke a search outside of the text messaging app. In an embodiment, invoking a search includes automatically initiating a search by presenting the search text string to a search engine interface to return results based on the search, in the event that a user selects the hyperlinked search string text in the message of the
(Continued)

message thread. Computing systems and processor-readable media embodying computer programs are also provided.

22 Claims, 4 Drawing Sheets

(51) Int. Cl.
    *G06F 16/951*     (2019.01)
    *H04W 4/14*     (2009.01)
    *H04W 4/12*     (2009.01)
    *G06F 16/955*     (2019.01)
    *H04M 1/725*     (2006.01)
    *G06F 9/54*     (2006.01)

(52) U.S. Cl.
    CPC ........ *G06F 16/951* (2019.01); *G06F 16/9558* (2019.01); *H04M 1/72552* (2013.01); *H04W 4/14* (2013.01); *H04W 4/12* (2013.01)

(58) Field of Classification Search
    CPC ......... G06F 17/30882; G06F 17/30867; G06F 17/30861; G06F 17/30554; G06F 17/30386; G06F 17/30876; G06F 16/9535; G06F 16/953; G06F 16/9558; G06F 16/955; G06F 16/951; G06F 16/248; G06F 16/547; G06F 16/52; G06F 9/547; H04M 1/72552; H04W 4/12; H04W 4/14
    See application file for complete search history.

(56) References Cited

U.S. PATENT DOCUMENTS

| | | | |
|---|---|---|---|
| 7,363,295 B2 | 4/2008 | Szeto et al. | |
| 7,676,746 B1* | 3/2010 | Alexander | G06F 40/103 715/257 |
| 7,966,304 B2 | 6/2011 | Bennett et al. | |
| 9,009,162 B1* | 4/2015 | Luo | G06F 17/30864 705/319 |
| 9,720,955 B1* | 8/2017 | Cao | G06F 16/951 |
| 2008/0126400 A1* | 5/2008 | Mitsuishi | G06F 17/30882 |
| 2008/0243810 A1 | 10/2008 | Brady | |
| 2009/0312040 A1* | 12/2009 | Gupta | G06Q 30/02 455/466 |
| 2011/0119133 A1* | 5/2011 | Igelman | G06Q 30/0261 705/14.58 |
| 2012/0011426 A1* | 1/2012 | Yach | G06F 17/2705 715/208 |
| 2013/0073661 A1 | 3/2013 | Chang et al. | |
| 2013/0138673 A1* | 5/2013 | Uemura | H04N 21/4788 707/758 |
| 2014/0164981 A1* | 6/2014 | Colley | G06F 3/0237 715/780 |
| 2014/0194153 A1* | 7/2014 | Salkintzis | H04W 76/10 455/466 |
| 2014/0325391 A1* | 10/2014 | Zhang | H04L 51/04 715/753 |
| 2015/0106446 A1* | 4/2015 | Brophy | G06Q 50/01 709/204 |
| 2015/0169142 A1* | 6/2015 | Longo | H04M 1/72572 715/751 |
| 2015/0189482 A1* | 7/2015 | Yang | H04W 4/12 455/466 |
| 2015/0220979 A1* | 8/2015 | Ouimet | G06Q 30/0251 705/14.49 |
| 2015/0310438 A1* | 10/2015 | Kassemi | G06Q 20/405 705/44 |
| 2016/0011758 A1* | 1/2016 | Dornbush | H04N 5/772 348/14.03 |
| 2016/0041961 A1* | 2/2016 | Romney | G06F 17/241 715/230 |
| 2016/0267200 A1* | 9/2016 | Guo | G06F 3/018 |
| 2017/0013014 A1* | 1/2017 | Foster | H04L 43/062 |
| 2017/0351693 A1* | 12/2017 | Boudville | G06F 17/3089 |
| 2018/0039406 A1* | 2/2018 | Kong | G06F 9/451 |
| 2018/0260728 A1* | 9/2018 | Mathew | G06Q 30/0241 |
| 2018/0293601 A1* | 10/2018 | Glazier | G06Q 30/0214 |

OTHER PUBLICATIONS

Translation of Li et al. Chinese Patent 1001004737.
Notice of Requisition and Examination Search Report of Canadian Intellectual Property Office.

* cited by examiner

PROCESSOR-IMPLEMENTED METHOD, COMPUTING SYSTEM AND COMPUTER PROGRAM FOR INVOKING A SEARCH

CROSS-REFERENCE TO RELATED APPLICATION

This application claims priority to Canadian Patent Application No. 2,939,395 filed on Aug. 15, 2016 entitled "METHOD AND DEVICE FOR INVOKING A SEARCH FROM A TENT MESSAGE", the contents of which are incorporated herein by reference.

FIELD OF THE INVENTION

This invention relates generally to applications on computing devices, and more particularly to a processor-implemented method, computing system and computer program for creating a hyperlink and invoking a search.

BACKGROUND OF THE INVENTION

Computers and mobile communications devices, for example cellular telephones, tablets, smartphones, smart watches and the like, have become a very popular means of accessing information sources and resources of all types for many daily activities, and for communicating with others for both business and personal purposes. In most populated regions, such digital devices provide individuals with virtually constant access to information and communications via the Internet.

Mobile telephones (also known as cellular telephones or smartphones) have the ability to connect to the internet either through a cellular network by conventional cellular technology, or through a local network utilizing 'Wi-Fi', and as such have become a particularly useful and widespread example of this. Mobile telephones are small enough to be easily carried virtually anywhere, and have evolved to provide myriad mobile device application programs or "apps" that allow users to perform various tasks in addition to telephony and connectivity to the Internet.

However, as a compromise in favour of mobility and ease of handling, mobile telephones suffer from the drawback that the display is very small. It is therefore not practical to use multiple apps simultaneously the way one can on a computer, where the display is large enough that windows generated by different applications can display data, interfaces etc. adjacent to other windows. The size of the display in a mobile telephone lends itself to displaying only one app's interface at a time. For the same reason, mobile telephones necessarily have very small keyboards for data entry, which makes typing difficult for many users. In many cases mobile telephones provide the keyboard as part of the touch-screen display, which further reduces the amount of display area available for app interfaces and data.

Because the keyboard is so small, any process that can reduce the amount of typing required by the user to perform a task is considered to be advantageous. It reduces both the time spent by the user performing tasks, and the user's frustration level with inevitable typographical errors attendant to the small size of the keyboard.

Also, because the display area is so small and is practically able to provide only one app's interface at a time for use by the user, any process that can facilitate toggling between the interfaces of different apps is advantageous.

It would accordingly be advantageous to equip a mobile device with a process that reduces the amount of typing required by the user, thus reducing the time taken to perform a task on the mobile device and opportunities for errors. It would further be advantageous to reduce or eliminate the steps required to toggle between different apps that are being used to perform related tasks.

SUMMARY OF THE INVENTION

In accordance with an aspect of the invention, there is provided a processor-implemented method of creating a hyperlink from a text messaging text entry field in a text messaging app on a user's mobile device, the method comprising assigning within the messaging app one or more keyboard characters as control characters respectively designating a start of a text search string and an end of a text search string; enabling the user to enter text including the control characters into the text messaging app text entry field; and upon the user activating a send command to send a text message that includes the start and end control characters defining the bounds of a search text string, displaying the search string as a hyperlinked text in the message thread selectable to invoke a search outside of the text messaging app.

In an embodiment, for invoking a search, the method comprises automatically initiating a search by presenting the search text string to a search engine interface to return results based on the search, in the event that a user selects the hyperlinked search string text in the message of the message thread.

In accordance with another aspect, there is provided a computing system comprising processing structure configured to create a hyperlink from a text messaging text entry field in a text messaging app operating on the computing system by assigning within the messaging app one or more keyboard characters as control characters respectively designating a start of a text search string and an end of a text search string; enabling the user to enter text including the control characters into the text messaging app text entry field; and upon the user activating a send command to send a text message that includes the start and end control characters defining the bounds of a search text string, displaying the search string as a hyperlinked text in the message thread selectable to invoke a search outside of the text messaging app.

In an embodiment, the processing structure is further configured to initiate a search by, in response to a user selecting the hyperlinked search string text in the message of the message thread, automatically presenting the search text string to a search engine interface to return results based on the search of the search text string.

In accordance with another aspect, there is provided a non-transitory processor-readable medium embodying a computer program for creating a hyperlink from a text messaging text entry field in a text messaging app on a user's mobile device, the computer program comprising processor-readable code for assigning within the messaging app one or more keyboard characters as control characters respectively designating a start of a text search string and an end of a text search string; processor-readable code for enabling the user to enter text including the control characters into the text messaging app text entry field; and processor-readable code for, upon the user activating a send command to send a text message that includes the start and end control characters defining the bounds of a search text string, displaying the search string as a hyperlinked text in the message thread selectable to invoke a search outside of the text messaging app.

In an embodiment, the computer program comprises processor-readable code for automatically initiating a search by presenting the search text string to a search engine interface to return results based on the search in the event that a user selects the hyperlinked search string text in the message of the message thread.

According to another aspect, there is provided a processor-implemented method of creating a hyperlink from a text string in a text entry application on a user's computing device, the method comprising, assigning within the application one or more keyboard characters as control characters respectively designating a start of a text search string and an end of a text search string; enabling the user to enter text including the control characters into the text entry application; and upon the user indicating the completion of entry of a text bracketed by the control characters into the text entry application defining the bounds of a search string text, displaying the search string text as a hyperlinked text in the application selectable to invoke a search outside of the text entry application.

In an embodiment, the computing device is a mobile computing device. In an embodiment, the application is a text messaging application. In another embodiment, the application is one or more of: a word processing application, a spread sheeting application, and a presentation application.

In an embodiment, the method is for invoking a search and comprises automatically initiating a search by presenting the search text string to a search engine interface to return results based on the search, in the event that a user selects the hyperlinked search string text in the application.

In an embodiment, initiating a search by presenting the search text string to a search engine interface to return results based on the search comprises copying the search text string within the message, invoking a browser, and causing the browser to initiate the search by presenting the search text string to a search engine interface to return results based on the search of the search text string.

In an embodiment, causing the browser to initiate the search by presenting the search text string to a search engine interface to return results based on the search of the search text string comprises opening a search engine user interface in the browser, pasting the search text string into a search field of the search engine user interface, and initiating the search to return results based on the search of the search text string.

In an embodiment, causing the browser to initiate the search to return results based on the search of the search text string comprises pasting the search text string into an address bar of the browser; and causing the browser to programmatically initiate the search using the search text string in the address bar of the browser.

In an embodiment, initiating a search by presenting the search text string to a search engine interface to return results based on the search comprises automatically constructing and sending a programmatic call to a search engine application programming interface (API); and receiving and displaying search results received from the API.

In accordance with another aspect, there is provided a computing system comprising processing structure configured to create a hyperlink from a text string in a text entry application operating on the computing system by assigning within the application one or more keyboard characters as control characters respectively designating a start of a text search string and an end of a text search string; enabling the user to enter text including the control characters into the text entry application; and upon the user indicating the completion of entry of a text bracketed by the control characters into the text entry application defining the bounds of a search string text, displaying the search string text as a hyperlinked text in the application selectable to invoke a search outside of the text entry application.

In accordance with another aspect, there is provided a non-transitory processor-readable medium embodying a computer program for creating a hyperlink from a text string in a text entry application on a user's computing device, the computer program comprising processor-readable code for assigning within the application one or more keyboard characters as control characters respectively designating a start of a text search string and an end of a text search string; processor-readable code for enabling the user to enter text including the control characters into the text entry application; and processor-readable code for, upon the user indicating the completion of entry of a text bracketed by the control characters into the text entry application defining the bounds of a search text string, displaying the search string as a hyperlinked text in the application selectable to invoke a search outside of the text entry application.

BRIEF DESCRIPTION OF THE DRAWINGS

In drawings which illustrate by way of example only a preferred embodiment of the invention.

DETAILED DESCRIPTION OF THE INVENTION

The invention will be described in the context of performing related tasks on a mobile device such as a "smartphone" by toggling between a text messaging program, for example an SMS app, and a search engine. However, this invention is applicable to toggling between other applications, preferably but not exclusively applications being run on the smaller form-factor of a mobile device, so as to enable selectively invoking searches and displaying their results as will be described.

In the typical case the search engine is accessed via an Internet-enabled browser, however it will be appreciated that the invention may be applied in like manner to accessing searches from other types of apps. Therefore, it will be appreciated that the method of the invention can be implemented in any digital communications or text entry environment offering a visual interface capable of displaying the selected text search string as a hyperlink and communicating with a search engine.

Figure 4:
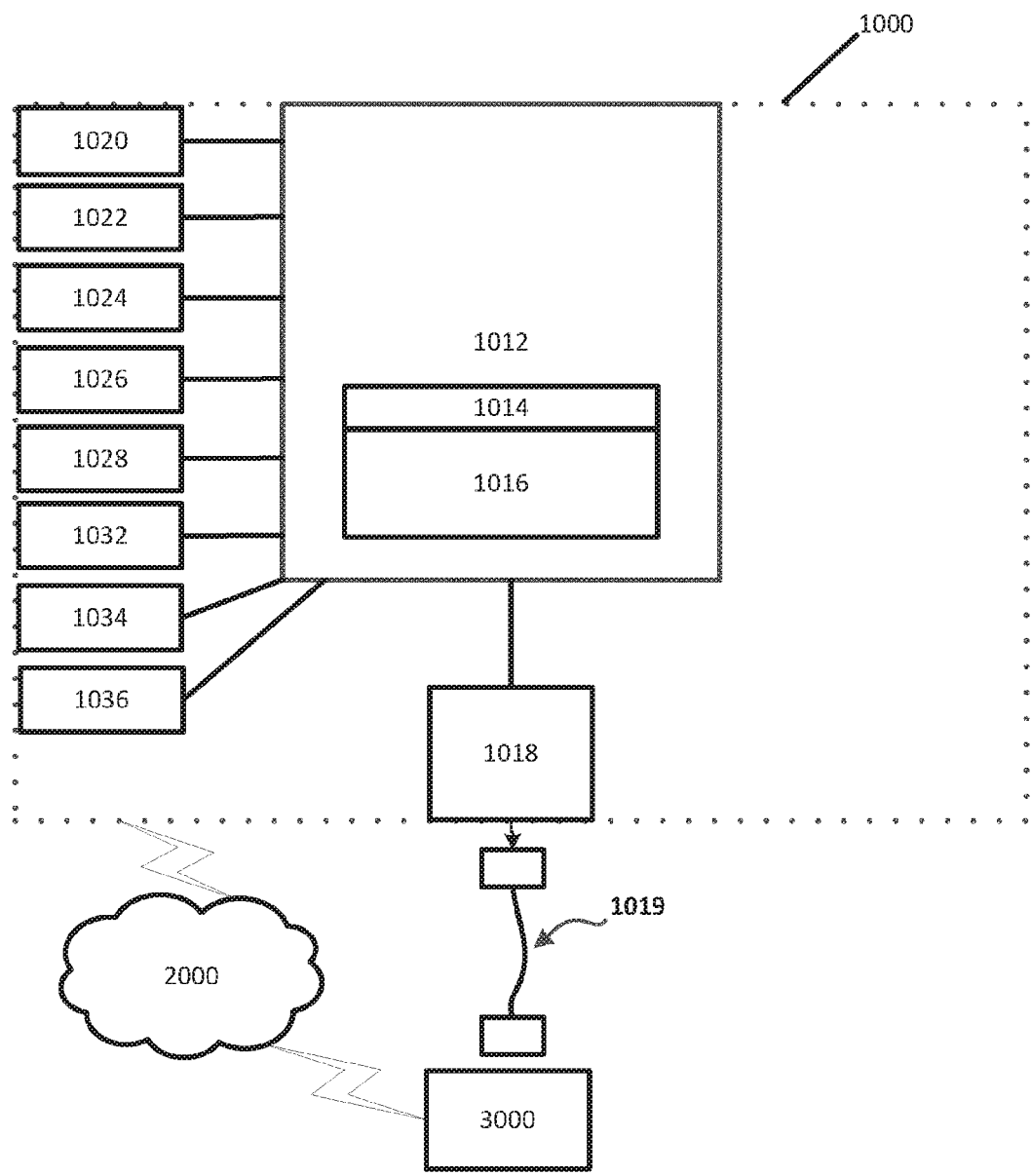
FIG. 4 is a schematic block diagram of components of a system according to an embodiment, including the mobile system in further detail and a remote processing structure.

In this embodiment, the processes described herein are implemented on mobile devices such as mobile system 1000 shown in FIG. 4. In this embodiment, each mobile system 1000 is a single mobile device in the form of a smartphone powered by an internal power supply such as a battery (not shown), which provides power to a main board 1012, which in turn converts the power as required for logic circuitry, and provides the power to various other components. Each of a touch screen 1020 displaying a user interface 10 or 30 as will be described below, physical buttons 1022, cellular transceiver 1024, a wireless Bluetooth™ transceiver 1026, a Wi-Fi™ transceiver 1028, and/or other wireless transceiver(s) (not shown), speaker 1032, microphone 1034, and wired communications interface 1018, as well as other components not shown, is operably connected to the main board 1012 to receive power and to communicate with a central processor 1016. In this embodiment, central processor 1016 is a single microcontroller and is in communication with onboard processor-readable memory 1014 configured to collect and store various pieces of data including operational data and processor-readable program code for programming the central processor 1016 to operate various user-interactive programs on the mobile system 1000 as well as to operate the various components of the mobile system 1000. In alternative embodiments, central processor 1016 may be a plurality of coordinated processors.

In this embodiment, wired communications interface 1018 is a USB (Universal Serial Bus) that can receive an external USB cable 1019 for enabling data communications with remote processing structure 3000 via one of its own USB ports in its communications interface such that data can be received by and sent to remote processing structure 3000. In an alternative embodiment, wired communications interface 1018 is configured to operate according to a different form-factor and/or protocol, such as Lightning™, Thunderbolt™, Firewire™ or some other wired interface. More typically, however, communications between mobile system 1000 and remote processing structure 3000 is encrypted and conveyed via a wireless connection through communications network 2000 such as the Internet including a Wi-Fi base station in communication with Wi-Fi transceiver 1028.

In this embodiment, the mobile system 1000 performs processing steps described herein in response to the central processor 1016 executing one or more sequences of one or more instructions contained in a memory, such as the memory 1014. Such instructions may be read into the memory 1014 from another computer readable medium, such as but not limited to a hard disk or a removable media drive. One or more processors in a multi-processing arrangement may also be employed to execute the sequences of instructions contained in memory 1014. In alternative embodiments, hard-wired circuitry may be used in place of or in combination with software instructions. Thus, embodiments are not limited to any specific combination of hardware circuitry and software.

The mobile system 1000 includes at least one computer readable medium or memory for storing instructions programmed according to the teachings of the invention and for containing data structures, tables, records, or other data described herein. Examples of computer readable media include but are not limited to PROMs (EPROM, EEPROM, flash EPROM), DRAM, SRAM, SDRAM, or any other magnetic medium or compact discs, hard disks, floppy disks, tape, magneto-optical disks or any other processor-readable medium.

Stored on any one or on a combination of computer readable media, the present invention includes software for controlling the mobile system 1000, for driving a device or devices for implementing the invention, and for enabling the mobile system 1000 to interact with a human user. Such software may include, but is not limited to, device drivers, operating systems, development tools, and applications software. Such computer readable media further includes the computer program product of the present invention, or aspects thereof, for performing all or a portion (if processing is distributed) of the processing performed in implementing aspects of the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A computer readable medium providing instructions to a central processor 1016 may take many forms, including but not limited to, non-volatile media, volatile media, and transmission media. Non-volatile media includes, for example, optical, magnetic disks, and magneto-optical disks, such as a hard disk or a removable media drive. Volatile media includes dynamic memory, such as the memory 1014. Transmission media includes physical cables or wires, but may also take the form of acoustic or light waves, such as those generated during radio wave or infrared data communications, for example Bluetooth™, Near Field Communications (NFC), and the like.

Various forms of computer readable media may be involved in carrying out one or more sequences of one or more instructions to central processor 1016 for execution. For example, the instructions may initially be carried on a magnetic disk of another remote computer. The other remote computer can load the instructions for implementing all or a portion of the present invention remotely into a dynamic memory and send the instructions over a communication line using a modem. A modem local to the mobile system 1000 may receive the data on the communication line and use an infrared transmitter to convert the data to an infrared signal. An infrared detector coupled to a bus can receive the data carried in the infrared signal and place the data on the bus. The bus carries the data to the memory 1014, from which die central processor 1016 retrieves and executes the instructions. The instructions received by the memory 1014 may optionally be stored on an external or selectively connectable storage device either before or after execution by central processor 1016.

It will be understood that additional components, such as status lights and audible indicators, though not shown in the drawings, may also be connected to central processor 1016 for use in operation of mobile system 1000.

While mobile system 1000 is a single mobile device in this embodiment, mobile system 1000 may alternatively be implemented as multiple mobile devices in close-range communication with one another (such as but not limited to a wired USB or other connection or alternatively as a wireless Bluetooth, NFC, Zigbee, ANT, IEEE 802.15.4, or Z-Wave connection, for example). For example, mobile system 1000 may include a smartphone and a wrist-mountable computing device, each having respective microcontrollers that work in concert via the wired or wireless connection to achieve a desired result as described herein. Mobile system 1000 may alternatively be implemented in the form of a laptop computing device either alone or in combination with another device, a head-mountable computing device such as a Google Glass™ device either alone or in combination with another device, or a tablet or alternatively some other suitable system that can be carried with a user during typical daily activities.

It will be understood that it is not necessary that all mobile system 1000s need be used in an overall system such as is described herein or be of the exact same construction. In one embodiment, a subject may make use of his or her own smartphone, which may employ an operating system from Android™, Apple™, Blackberry™ or some other producer, provisioned as described herein.

In this illustrative embodiment, the mobile device (not shown) is pre-programmed with an operating system package, as is well known, which typically includes at least one browser and at least one text messaging app. Alternatively or additionally, a text messaging app and/or browser can be loaded onto the mobile device in conventional fashion. As used herein "text messaging" includes SMS, instant messaging, e-mail and all other platforms or programs or applications a send text in an editable format.

Figure 1:
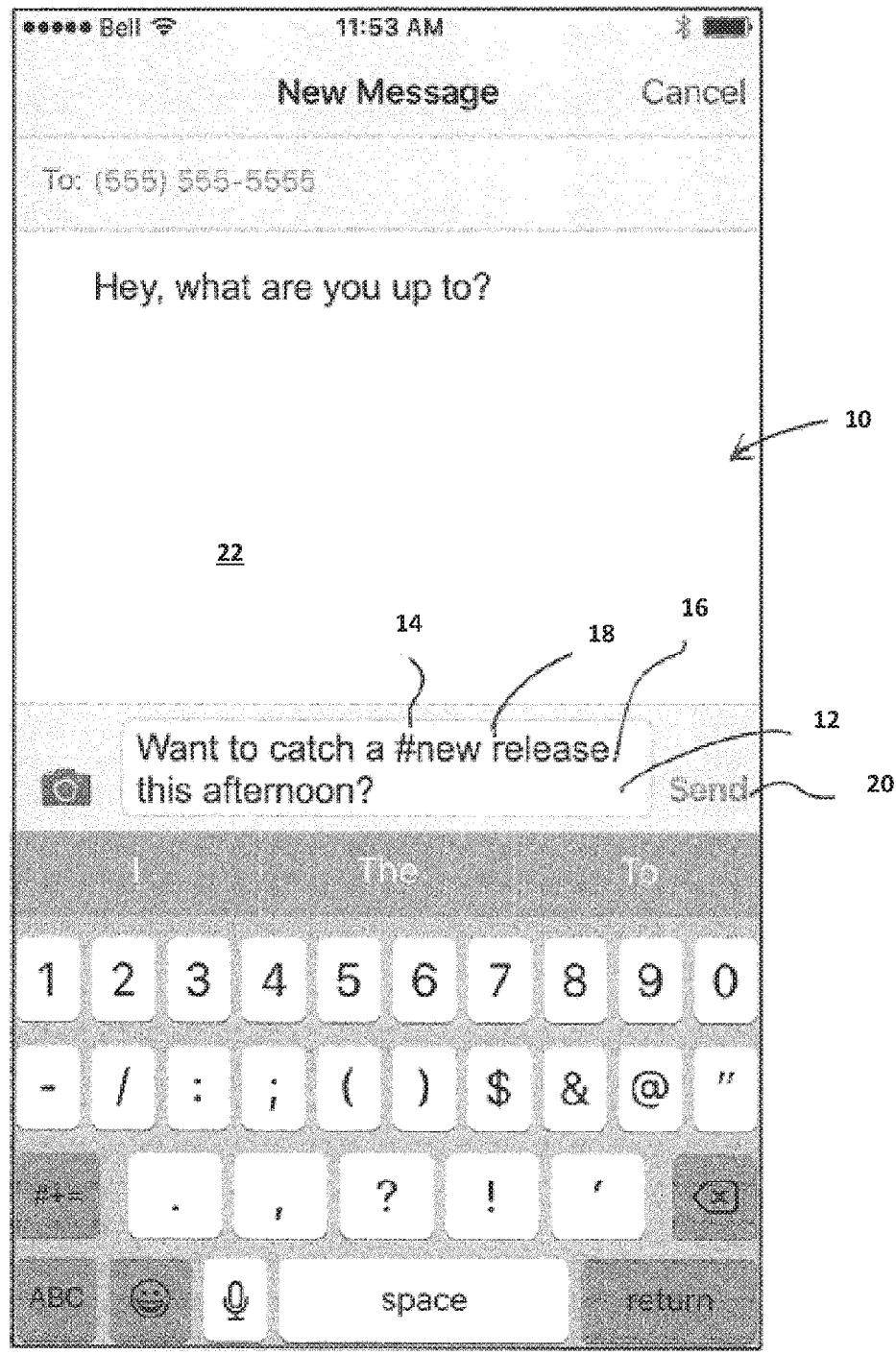
FIG. 1 is a screen shot of the user interface in a first app having a text entry field for receiving a text string, showing a text string input to utilize the method of the invention.

FIG. 1 illustrates, by way of non-limiting example, the interface 10 of a popular SMS text messaging program. In the embodiment shown the "keys" for both typing and functions are displayed on the device display as is well known. In other embodiments a "physical" keyboard may be used in the same fashion.

One or more keyboard characters 14, 16 may be assigned as control characters respectively designating the start and end of a text search string 18 in the text messaging text entry field 12. The control characters 14, 16 are preferably individual characters that are not normally used in a text message, or a string of characters that would rarely if ever appear together in a word or sentence in the relevant language (e.g. 'xx' in English). In the embodiment illustrated, a pound sign '#' (more recently known as a "hash tag") is assigned as the text search string start character 14 and a period '.' is assigned as the text search string end character 16.

The app is programmed to recognize the text following '#' and preceding '.' as a search string, and may for example display the search string in a different font, colour or style to reflect its character as a search string in the messaging text entry field 12. The start and end control characters 14, 16 may be the same text or keyboard character, although the coding capable of recognizing the hounds of the text search string in this instance might be somewhat more involved.

During use of the text messaging application configured according to the invention, the user enters (or selects) a recipient and then enters data into the text messaging text entry field 12. It will be appreciated that the invention envisages all manners of entering text into a field, including without limitation data entry through the keyboard (typing), pasting text from a text buffer, entering data vocally using a voice recognition app, using a gesture or otherwise.

Figure 2:
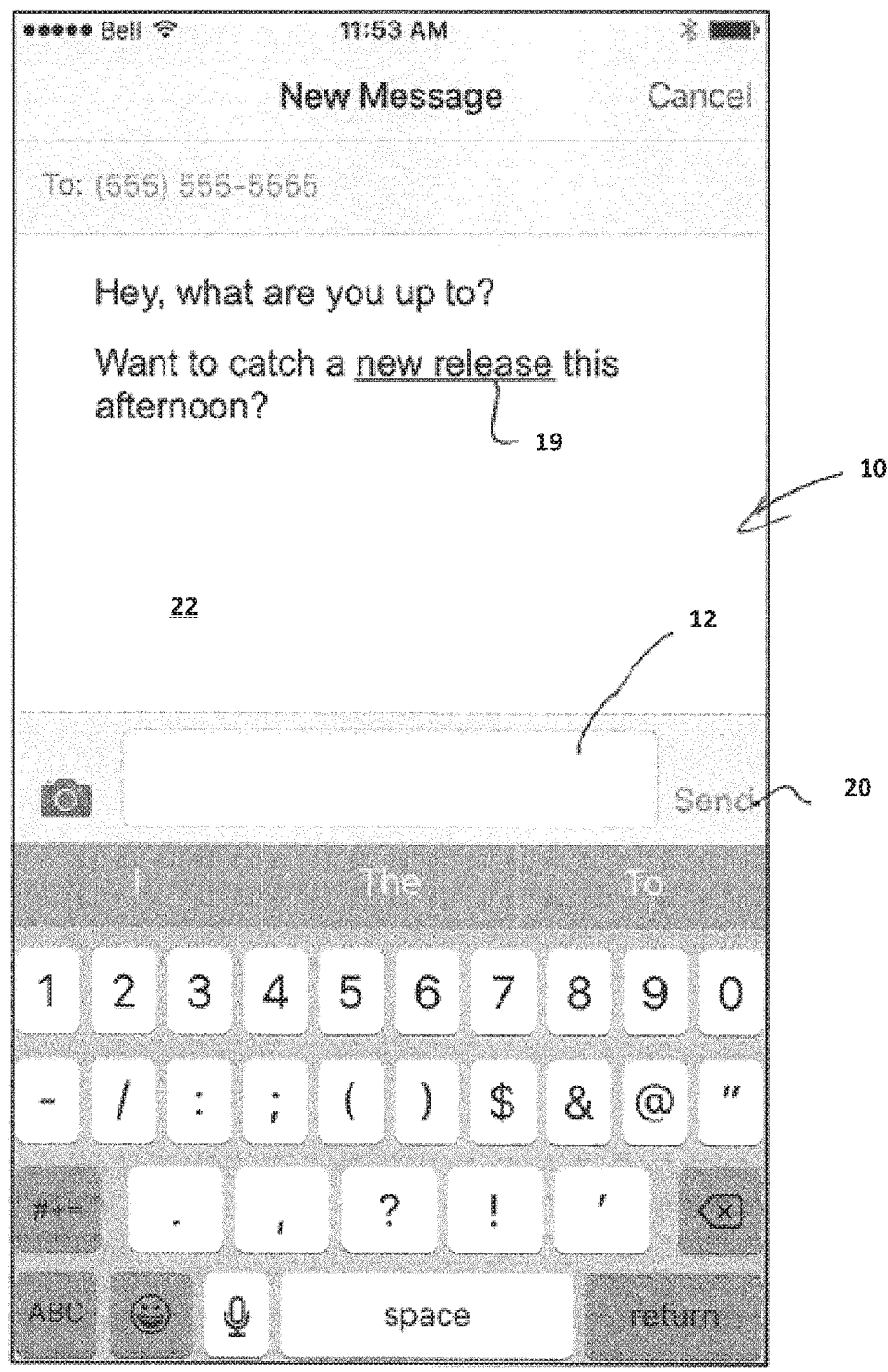
FIG. 2 is a screen shot of the user interface in the first app after the text message has been sent, showing a section of the text string converted to a hyperlink in the conversation window.

Once the message with the search string, following '#' and preceding '.' is sent by the user touching (or in the case of a physical keyboard, pressing) 'send' key 20, the search string is automatically displayed as a hyperlink 19 amongst the other words of the message in the message thread appearing in the message conversation window 22, as shown in FIG. 2, preferably for both the sender and receiver(s) of the conversation. It will be understood that, in the event that the application used by the receiver(s) of the text message is configured to recognize the control characters, hyperlink 19 will appear to the receiver(s) and will be selectable to initiate the search. However, in the event that the application used by a receiver of the text message is not configured to recognize the control characters (and accordingly to generate a hyperlink 19 accordingly), the text message with the control characters will be displayed to the user in non-hyperlinked (plain text) format. The display of the text along with the control characters bracketing it at the receiving end may cause a receiving user to question why the text is displayed that way and to investigate upgrading or changing the application in which such content is viewed to receive the benefit of the searchable hyperlink 19. For example, Apple's iMessage messaging application might be initially equipped on a particular iPhone according to the present invention to display such hyperlinks 19 in an SMS message, but may be used to send such SMS messages to a receiver who owns, for example, a Blackberry™ Priv with a messaging application that is not so equipped. The receiver, not initially having an application equipped to view hyperlinked search text, will see the control characters and, being curious, may ask the sender why they are being displayed. The sender will likely recognize that the control characters he or she entered do not have the desired effect on the receiver's mobile device, will explain what they are for, and will accordingly encourage the receiver to consider downloading a new or upgraded messaging app for future use thereby to gain the advantage of the hyperlinked search text functionality.

To initialize the system, the user is requested to enter the Uniform Resource Locator (URL) of a search engine, preferably when the user first installs the app embodying the invention, and may be asked to specify a default browser. The "preferences" options preferably allow the user to change these at any time. The user is then ready to start using the invention.

The search routine begins as the user clicks the hyperlinked search string 19 in the message thread of the messaging, app 22 (see FIG. 2). The app coding then performs the following steps to yield the results illustrated in FIG. 3:

i. copying the search text string within the message,
ii. invoking a browser,
iii. opening a search engine interface in a browser tab,
iv. pasting the search text string into the search field of the search engine interface, and
v. initiating a search to return results based on a search of the search text string.

This can be represented as:
"Copy" TEXT TO CLIPBOARD in the messaging app
"Open" (or "Maximize") BROWSER app
"Open" NEW TAB in the browser app
"Go To" URL[ . . . ] of the search interface of a designated search engine (for example Google, Yahoo, etc.)
"Go To" SEARCH FIELD in the search interface of the designated search engine
"Paste" TEXT FROM CLIPBOARD into the search field of the search interface
"Click" ENTER to initiate the search represented by the search text string.

In the preferred embodiment the app is thus programmed to, merely upon the user clicking the "hyperlinked" search string 19 displayed in the message in the text messaging app conversation window 22 as shown in FIG. 2, automatically:

copy the hyperlinked text into the device's text buffer (or 'clipboard'), for example using the copy function native to the device's operating system;
open the default browser;
open a new tab in the browser;
enter the URL for the designated search engine and go to the browser search interface 30;
paste the copied text search string 18 into the search engine interface search field 32; and
enter the search string (i.e. emulate clicking 'return') to perform the search.

This reduces the number of keystrokes and display actions required to be performed by the user, facilitating the search while reducing the time required to enter the text search string (eliminating the redundancy of entering the search string twice), and by automatically toggling between apps to perform the search using the selected search string. This is particularly useful for the novice user, who may be unaccustomed to finding and switching back and forth between apps, but even skilled users will experience a time savings and reduced rate of typographical errors in the transposition of the search string from a text-based app to a search engine.

Figure 3:
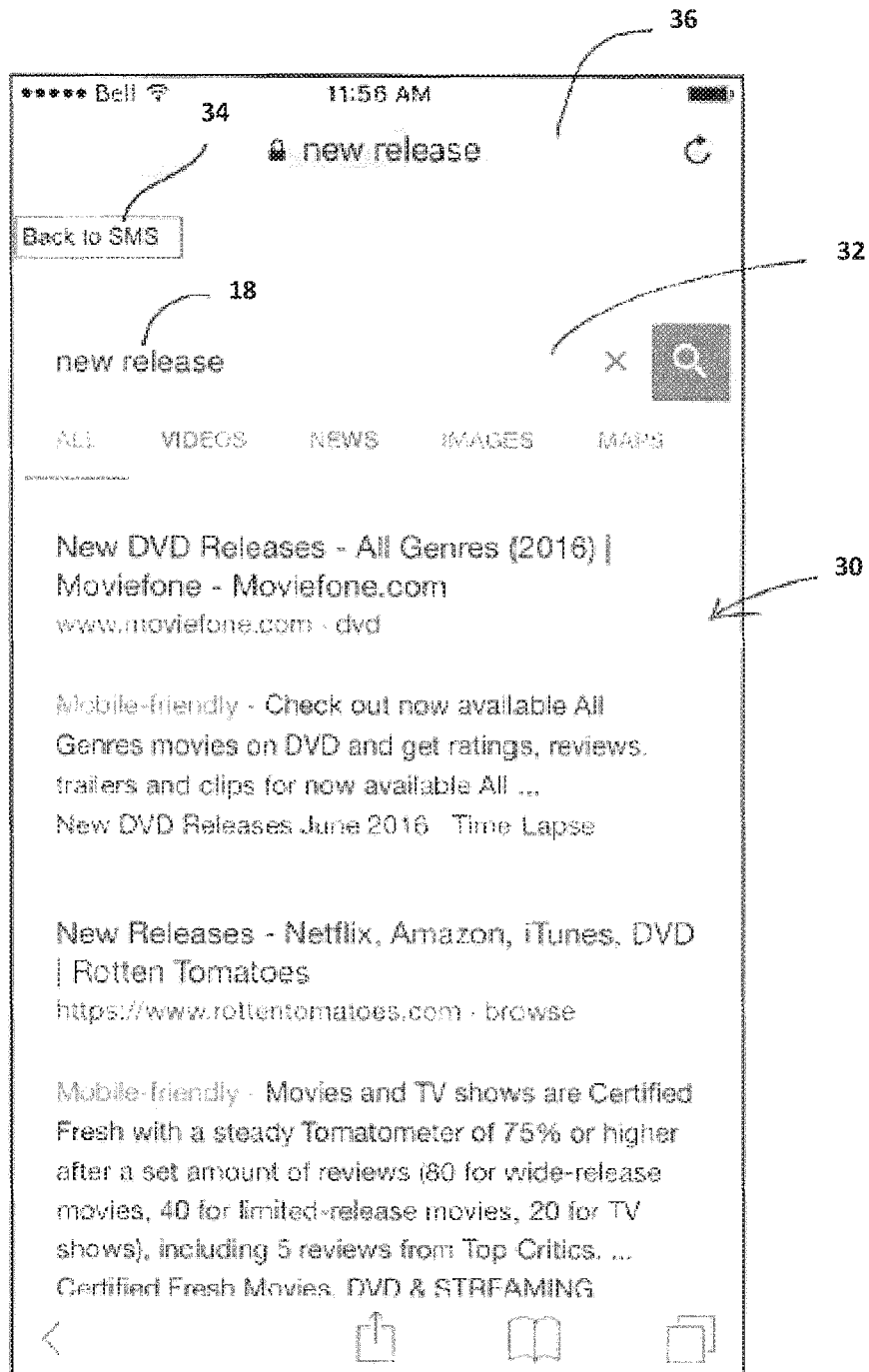
FIG. 3 is a screen shot of the user interface in a second app having a text entry field for receiving the search text string generated by the invention, returning results from a search of the search text string.

In a preferred embodiment the browser optionally provides a "Back to SMS" button 34, shown in FIG. 3, which can be clicked by the user after viewing the search results in order to toggle back to the location of the corresponding hyperlink 19 in the text message in the text messaging program that was selected to invoke the search, allowing the user to continue the text conversation, for example conveying to the recipient the information learned about the conversational topic from the search. It will be understood that, in embodiments in which the browser is invoked as described above from a different program—one that would not be referred to as an SMS program the back button 34 may display a slightly different message appropriate to the program to which button 34 would return a user. It will also be understood that some devices use a general back button as part of their user interface navigation (i.e. Android, Blackberry etc.), to achieve a similar result. The invention may be coded to employ such a button/function for these devices to enable the user to achieve a similar result as described above.

Each new browser tab invoked by the app of the invention may be linked to the corresponding text search string 18 that was typed into the text messaging app text field 12, moved to the conversation thread in the window 22 when sent to the recipient where the text search string 19 is preferably identified as a link, and clicked to generate that particular search. These links can be stored in a buffer, such that for every text search string 19 there is one associated browser tab, In these embodiments, if the user clicks the same text search string 19 again in the conversation window 22 of the text messaging program the device toggles to the existing tab for the text search string 19 by default, to reduce processing time and downloading latency. However, if the tab associated with that text search string 19 had been closed by the user, the process described above can simply repeat and a new tab will be opened to perform the search again using the sent text search string.

The system of the invention provides opportunities for monetization, much the way that search engines do. Companies can purchase keywords, for example used at specific geo-locations, at specific time intervals to generate sponsored links, which are stored in a database by a system administrator. Each time a search is performed by the app of the invention, any keyword associated with a sponsor in the administrator database initiates a subroutine that returns a hyperlink to a URL designated by the sponsor in preference to the hyperlinks returned by the search. For example the sponsored links may appear above the list of hyperlinks returned, or may be distinguished in some way from the results returned by the search, in the same manner as search engines currently do.

For example, rather than displaying the search engine results page directly the app can programmatically receive the search results, scrub the hits returned by the search engine, and automatically generate an HTML page similar to what the search engine would have provided by emulating it so as to list sponsored links at the top of the list of hits and display the search engine results as secondary hyperlinks after the sponsored hyperlinks. This may be done, for example, by adding the following steps after or upon initiating the browser search:

"Buffer" KEYWORD, GEO-LOCATION & TIME for comparison with sponsored keywords

"Go To" LOOKUP TABLE containing sponsored keywords

"Compare" KEYWORD, GEO-LOCATION & TIME to stored keywords, geo-location and time If KEYWORD matches STORED KEYWORD:

"Get" HYPERLINK associated with keyword and request and receive search results from the search engine "Scrub" SEARCH RESULTS from what is received from the search engine "Generate" RESULTS LIST including associated sponsored hyperlink and search results "List" SPONSORED HYPERLINK in results list first "List" SEARCH RESULTS below sponsored hyperlink In an alternate embodiment, instead of recognizing the text following the start control character 14 and preceding the end control character 16 as a search string and utilizing the search field of a search engine, an app for performing the invention could be coded to recognize the text following the start control character 14 and preceding the end control character 16 as including an indication of a URL and a search text string. In this embodiment, when the 'send' button is clicked by the user instead of or in addition to displaying the search text string as a hyperlink in the message in the message thread, the app may open a new tab in the browser and paste the URL into the address bar in order to proceed directly to the specified search engine web site at that URL and to initiate the search using that search engine for the search text. This would allow the user to specify a search engine on an ad hoc basis (or to specify another kind of website or platform or application that can accept arguments in a URL query). For example, a user may enter "Google Pizza Place" in between the start and end control characters, and the search may be automatically commenced once the hyperlinked text is selected, by the application having parsed the text and recognized Google as being a website that can be identified by URL as https://www.google.ca and the search text as "Pizza Place". The application may maintain a table of popular search engine or website names (Google, Yahoo, Ring etc.) and their associated URLs for this purpose. The application accordingly would launch a new tab in the browser once the hyperlink was selected, and would construct and paste "https://www.google.ca/search?&q=pizza+place" or similar into the address bar thereby to both navigate to the Google search website stored in the table and to cause the Google search website to conduct the search using search text "Pizza Place" as query arguments. In embodiments according to this aspect of the invention, the text "Google Pizza Place" would be hyperlinked. In other embodiments, just the text "Pizza Place" would be hyperlinked in the message thread, with the word "Google" being treated more programmatically as described above but kept from being displayed once the search text string has been hyperlinked.

Similarly, a user may enter "Yahoo Pizza Place" in between the start and end control characters, and the search may be automatically commenced by the application parsing the search text and recognizing Yahoo as being a website that can be identified by URL as https://ca.search.yahoo.com/search and the search text as "Pizza Place". The application accordingly would launch a new tab in the browser and would construct and paste "https://ca.search.yahoo.com/search?p=Pizza+Place" or similar into the address bar thereby to both navigate to the Yahoo search website and to cause the Yahoo search website to conduct the search using search text "Pizza Place".

Similarly, the application may further recognize the word "Place" or synonyms thereof in the search text "Google Pizza Place" and the search may be automatically commenced by the application recognizing Google as being a website that can be identified by URL but also that, because the word "Place" was in the search text that a specific sub-type of search for example a search for nearby places using Google Maps—is the most appropriate search to automatically conduct. In the case of Google Maps, the application would accordingly launch a new tab in the browser and would both construct and paste "https://www.google.ca/maps/search/pizza+place/@43.6314022.-79.3941305" or similar into the address bar thereby to navigate to the Google Maps search website and to cause the Google Maps search website to conduct the search using the search text "Pizza Place" and information about the current location of the device on which the application is running (referring to the @43.631 . . . , 79.394 . . . appended to the example URL above). The application may maintain a table of multiple sub-types associated with particular keywords such as "Place", "Location" either in association with each search engine or by itself allowing for selection of the search engine and/or subtype of search. Other sub-types, such as those relating to time or other factors relating to the type of search results intended may be maintained in association with each search engine or by themselves. These could permit a user to select the search engine and/or a subtype of search which is maintained in connection with other keywords, such as the word "seen" in the search text string "Have you seen Rihanna's hair lately?" to trigger an image search from Google rather than a search through all content, or the word "play" in the search text string "Gerald Clayton can really play the blues.") to trigger a video search from Google rather than a search through all content. Alternatively or in some combination, in an embodiment the application is triggered to insert location information into the search query according to indications in the search text string itself. For example "Let's grab # pizza near me." would cause the application on the sender's device to, triggered front the "near me" portion or a synonym thereof insert geo-location information corresponding to the sender's current location. On the other hand "Let's grab # pizza near you," would cause the application on the sender's device to, triggered from the "near you" portion or a synonym thereof, put in a placeholder in the location information variable/argument of the search query, so that the application on the receiver's device could insert the receiver device's location information only once the message was received at the receiver's device. The receiving user could click the hyperlink and have the search query conducted using the receiving device's geo-location information. In the event the original receiver responds to the original message from the original sender, such geo-location information could automatically be sent back to the original sender to update the placeholder in the search query hyperlinked on the original sender's device with the original receiver's device geo-location information thereby to enable the original sender to click the hyperlink and conduct his or her own search for pizza places that are actually near to the original receiver. Restrictions on location privacy, whether user-selected or legislated, should be factored in implementations of this aspect of the invention.

The actual location information may be gleaned from the global positioning system of the device or devices themselves, or be automatically inserted by the search website using network data information corresponding to the device-server communications.

In the event that the user, upon entering such a search string bracketed with control characters thereby to cause the search text string to be hyperlinked, decides to delete or otherwise edit the search text string prior to sending the message or otherwise confirming the search text string, the application may permit this even though it had already hyperlinked the text. For example, the user could press the delete button after having entered the end control character to backtrack through the search string. Once the application recognizes this action (deletion of the end control character), it will automatically display the entire search string (minus any of the actual search text string that has additionally been deleted) inclusive of (per the example above) the "Google" text preceding the "Pizza Place" text, thereby providing the user with fuller control over editing or deleting the entire search text string. For example, in a scenario whereby the search text string is hyperlinked and displays as follows "Let's find some PizzaPlace John!", the user pressing delete through the word "John" to edit the text to be "Let's find some PizzaPlace Jo!" and then "Let's find some PizzaPlace", will have displayed to him/her with an additional delete action (that effectively deletes the end control character): "Let's find some Google Pizza Place" (the end control character now removed and thus the hyperlinking removed) which the user may ultimately see fit to change to something like: "Let's find some Yahoo Pizza Joint" which would be displayed after the end control character was re-entered as "Let's find some PizzaJoint" but, as described above, with an HTML query to the Yahoo search engine and with a different search text string. In this way, the user is provided with a convenient interface for both creating the hyperlinks as described as well as editing them. However, in the messaging application scenario, once the message is sent it would generally not be editable again by either the sender or the receiver.

In embodiments, the user who has entered the text may be automatically navigated to a browser per the search text string and any other arguments, once be or she has pressed the Send button. In this way, the sender simultaneously sends the message to the intended receiver and triggers the search for the sender at the same time. Once the message is received at its destination, being hyperlinked the search can also be triggered by the receiving person on the receiver person's device as described. As will be understood, the generation of a search query that can be used identically by both the sender and the receiver in this way will increase the likelihood that the same search query will be conducted more than once. This could have implications for advertising "click" revenue, but may also have implications for data mining by the search engine which may be able to infer a conversation between two or more devices making the exact same queries of the search engine.

To further thus, in an embodiment the search query generated as described above front a given search text siring is supplemented with a search query identifier in the HTML. For example, the application generates the following search query: "https://www.google.ca/search?&q=pizza+place" or similar and may also be configured to append a unique search identifier argument to the query by combining the MAC address of the sender device, a timestamp, or some other differentiator that can distinguish the query from other, unrelated, searchers' similar queries. For example, the search query may be augmented automatically by the sender's device to be https://www.google.ca/search?&q=pizza+ place&SID=14ac2954378 or similar with the "SID=14ac2954378" portion referring to a search ID variable/argument (automatically generated by the application) that the search engine can parse as an argument to the search. While such a search ID variable/argument would not be part of the search string text the search itself would be based on, should the same query come to the search engine from another device the search engine would be able to infer sender and receiver devices through the common search ID and search text string itself. It is unlikely that a search engine could infer such a relationship from just the search text string since very many unrelated people may be simultaneously searching for the same thing (a pizza place, for example, or information about a new Grammy winner just awarded). In this way, provided search queries are conducted, the search engine could infer relationships between querying devices (and their users), without having to have any direct access to the telecommunications networks upon which the devices are transmitting and receiving their messages. In a similar manner, outside of the text messaging application, such a search ID could be used to infer relationships between querying devices on which copies of an original document (such as a Word document) containing such a search query has been saved. Furthermore, information about the messaging or other application could be sent along with the query as an argument thereby to enable the search engine to be aware that the search query came through ultimately from that application, and was not entered manually by a user at the search engine user interface through the browser.

Variations are possible. For example, in an embodiment a user interface element such as a button or gesture recognition etc. enables a user to toggle between a search text mode and a query mode so the user can choose whether the search is to automatically occur upon pressing Send, or whether actual clicking of the hyperlink is required.

In one embodiment the end control character 16 can be a space. In this embodiment a start control character, for example a hash tag (#), can be used to designate the start of the search string. As long as no spaces are used in the search string 18, the app coding could identify all words following the start control character 14 (with no spaces between words) and preceding the next space as the search string to be displayed as a hyperlink 19 in the conversation thread window 22 and copied and pasted into the search bar when the hyperlink 19 is clicked. Although depending on the search being requested there can be some ambiguity in this embodiment, some search engines are sufficiently advanced as to recognize and parse the words in a search string, in many cases, even if the words are pasted into the search field with no spaces in between words. Thus, the effectiveness of this embodiment may depend on the particular search requested and the robustness of the search engine. It is recognized that other applications, such as Twitter and other social media applications, "hashtagging" using # for tracking and identifying buzzwords and the trends they identify is very common. As such, while the start control character could be a hash tag and the end control character a space, it may be useful to reduce any confusion for users who are familiar with and using such other applications, by providing the disclosed functionality using a different start control character than a hashtag, when applying the invention to these applications.

In an alternative embodiment, a new function can be created or the keyboard or in the text messaging app that can be triggered on and off by a button, gesture, command or voice command etc. to add a special feature to the text being entered, either visible or latent, to invoke the method of the invention. For example, as a start control character 14 the function can be engaged to identify the text entered while engaged to be a search string, and then disengaged to mark the end of the search string. This enables the app's programming to identify which text or words to copy into the text buffer as a search string. Similarly a button having a functionality unique to the invention, such as a "HYPER Text" button which the user engages in order to identify that the words or text which follow until the button is disengaged are to be designated as a hyperlink 19 and to be copied and presented to the search engine, would obviate the need for a user to type actual start and end control characters 14 and 16 to bracket the search text when the search text is being entered.

For example, in this embodiment, the user pressing the "HYPER Text" button would put the app in a condition to insert a start control character and the user pressing that button again would insert an end control character, provided some search text had been inserted. In the event that no search text was inserted, then the app might remove the already-inserted start control character and would not insert an end control character when the "HYPER Text" button was pressed again to disengage.

Because in embodiments involving a "HYPER Text" button or similar tool for invoking a search text mode a user would not have to manually type control characters, such control characters could themselves be kept invisible to a user, with a different kind of visual indication being provided to the user in the form of an underline and/or colour and/or some other cue of the actual search text. For example, the control characters could be formed and treated similarly to tags in a markup language (such as the underlying text "<HT_BUTTON_ON>Mission Impossible Movie <HT_BUTTON_OFF>" being displayed as " MISSIONIMPOSSIBLEMOVIE" or "→Mission Impossible Movie←" or "Mission Impossible Movie" where the search text itself is "Mission Impossible Movie". In an embodiment, a user can choose how search text is to be displayed on his or her device.).

While in embodiments described above a default browser is opened and the browser is automatically directed to navigate to the URL of the selected search engine to enter the search string into the search field of the resultant URL page for the search engine, alternatives are possible. For example, in the event that the default browser to be opened has an address bar that is configured to function both as a URL-entry field and as a search-string entry field, the search may be invoked via the browser address bar by the app automatically invoking the browser with instructions to enter the search string from the text message into the address bar of the browser when the user clicks the hyperlinked text in the conversation thread thereby to invoke the search. The entry of the search string into the address bar causes the browser to programmatically initiate the search by the browser formulating the programmatic call to an API (Application Programming Interface) of the search engine (such as Google) or alternatively by itself automatically retrieving the search engine user interface search page, pasting what is in its address bar into the search field and initiating the search.

While, in embodiments described above a browser is opened when a user clicks the hyperlinked text in the text message, alternatives are possible. For example, the messaging app may be configured to structure search requests programmatically itself thereby to make calls to a search engine server directly via HTTP rather than having to open an actual browser, and to itself receive the search results for display by the messaging app. Such programmatic access to search results may be done by the messaging app automatically constructing and sending calls to one or more of many APIs (Application Programming Interfaces) of a search provider, such as Google. This may be done by simply mimicking the HTTP "GET" command that a straightforward search engine user interface might automatically construct employing text entered into a search field as GET command arguments, or by understanding a slightly more complex (though well understood) process such as by constructing a JSON (JavaScript Object Notation) or XML (eXtensible Markup Language) call to a more sophisticated search engine API. This alternative may be useful in the event that the messaging app (or whichever app is configured with the method of the invention, to structure text to be searched as hyperlinks) is itself configured to display such search results in-line with the text message itself, rather than within the browser app, or to filter or format the search request or the search results in some appropriate way. For example, clicking the hyperlinked text may not only invoke a programmatic search, but allow toggling between viewing the text messages with hyperlinks, and the text messages with hyperlinks in addition to the search results themselves, allowing a user to toggle between seeing the search results fully or partially displayed within the conversation itself, or simply seeing the selectable hyperlinks which, when selected, reveal the in-line search results. Variations are possible.

While embodiments disclosed herein are well-suited to applications being operated on mobile devices, and particularly for messaging applications on mobile devices, it will be understood that the principals described herein may be employed in messaging applications running on other kinds of devices, such as but not limited to desktop computers, laptop computers, and/or in other kinds of applications involving text entry in which automatic hyperlinking of search text bracketed with control characters for the purpose of enabling a viewer of a document or other collection of text to invoke searches may be useful. For example, bracketing search text with control characters as described above in a word processing application such as Microsoft Word™, or a spread sheeting application such as Microsoft Excel™, or in a presentation application such as Microsoft Powerpoint™, and so forth, may be useful. In such embodiments, rather than the user pressing "Send" as one might do for a messaging application, the process of converting the entered text bracketed by control characters to a hyperlink could be activated by the user taking some other activating action indicating the end of a search string with control characters, such as the user entering a space after the end control character (i.e. in embodiments above, the following the search text preceded by a '#'). A subsequent viewer of the document, such as the author or another person, would be able to select the automatically-created hyperlink thereby to invoke the search in one or more of the manners described herein.

Various embodiments of the present invent having been thus described in detail by way of example, it will be apparent to those skilled in the art that variations and modifications may be made without departing from the invention. The invention includes all such variations and modifications as fall within the scope of the appended claims.

The invention claimed is:

1. A processor implemented method of improving a user interface of a computing device by creating a hyperlink in a text entry application on a user's computing device presenting the user interface, the method comprising:

assigning within the text entry application one or more keyboard characters as control characters, wherein one of the assigned control characters respectively designates a start of search string text and another assigned control character respectively designates an end of search string text;

enabling the user to enter into the text entry application any arrangement of user selected characters that comprise search string text with the control characters designating the start and end thereof; and upon the user indicating completion of entry of the search string text bracketed by the control characters into the text entry application, the control characters defining the bounds of the search string text, automatically generating using the search string text a hyperlink including only the search string text, and displaying the hyperlink including the search string text in the application in place of the search string text and the control characters, wherein the displayed hyperlink including the search string text is user selectable to automatically invoke a web search in a separate web browser application outside of the text entry application and to enable the web browser application results of the search to be displayed through the user interface.

2. The processor-implemented method of claim 1, wherein the text entry application is a messaging application, and the user indicating the completion of entry comprises the user activating a send command to send a message that includes the start and end control characters defining the bounds of the search string text.

3. The processor-implemented method of claim 1, further comprising: responsive at least in part to user selection of the displayed hyperlink including the search string text in the text entry application, automatically invoking the search by presenting the search string text to a search engine interface to return results based on the search.

4. The processor-implemented method of claim 3, wherein automatically invoking the search by presenting the search string text to a search engine interface to return results based on the search comprises:

copying the search string text;

invoking the web browser application; and causing the web browser application to invoke the search by presenting the search string text to a search engine interface to return the search results based on the search of the search string text.

5. The processor-implemented method of claim 4, wherein causing the web browser application to invoke the search by presenting the search string text to a search engine interface to return the search results based on the search of the search string text comprises:

opening a search engine user interface in the web browser application;

pasting the search string text into a search field of the search engine user interface; and invoking the search engine to return the search results based on the search of the search string text.

6. The processor-implemented method of claim 4, wherein causing the web browser application to invoke the search to return the search results based on the search of the search string text comprises:

pasting the search string text into an address bar of the web browser application; and causing the web browser application to programmatically invoke the search using the search string text in the address bar of the web browser application.

7. The processor-implemented method of claim 3, wherein automatically invoking the search by presenting the search string text to a search engine interface to return results based on the search comprises:
   automatically constructing and sending a programmatic call to a search engine application programming interface (API); and
   receiving and displaying through the user interface search results received from the API.

8. The processor-implemented method of claim 3, wherein automatically invoking the search comprises:
   parsing the search string text and, if the search string text contains an indication of a particular search engine, causing the search string text to be presented to the search engine interface of the particular search engine.

9. The processor-implemented method of claim 3, wherein automatically invoking the search comprises:
   parsing the search string text and if the search string text contains an indication of a location, causing the search string text to be presented to the search engine interface in association with location information corresponding to the location.

10. The processor-implemented method of claim 4, wherein causing the web browser application to invoke the search to return the search results based on the search of the search string text comprises:
    automatically creating a Uniform Resource Locator (URL) search query based on the search string text;
    pasting the URL search query into an address bar of the web browser application; and
    causing the web browser application to programmatically invoke the search using the URL query in the address bar of the web browser application.

11. The processor-implemented method of claim 10, wherein automatically creating the URL search query comprises:
    parsing the search string text for an indication of a particular search engine;
    generating a URL including a web location of the particular search engine; and
    appending arguments to the URL based on the search string text.

12. The processor-implemented method of claim 11, further comprising: parsing the search string text for an indication of a location;
    generating location information corresponding to the indication of the location; and
    appending arguments to the URL based on the generated location information.

13. The processor-implemented method of claim 3, wherein the search engine interface is displayed within a browser tab of the web browser application, wherein each of a plurality of respective hyperlinks including respective search string text in the text entry application, links to a respective browser tab.

14. The processor-implemented method of claim 13, wherein if a respective browser tab is not open, selecting of a corresponding hyperlink including search string text causes the respective browser tab to be opened in the web browser application for invoking the search.

15. The processor-implemented method of claim 3, comprising: receiving a search results web page from a search engine in response to the invoked search;
modifying the search results web page to add sponsored search result links to create an emulated search results page, wherein the sponsored search result links correspond to keywords in the search string text in a lookup table; and
displaying through the user interface the emulated search results page.

16. The processor-implemented method of claim 3, wherein if the search string text is recognized to include an indication of a search engine, automatically causing the web browser application to navigate to, and search at, a Uniform Resource Locator (URL) corresponding to the indicated search engine.

17. The processor-implemented method of claim 4, comprising: causing the web browser application to display an additional button, which when selected by a user toggles back to the text entry application from which the search was invoked.

18. The processor-implemented method of claim 3, comprising: upon a user selecting the hyperlink including the search string text in the text entry application, if the search string text comprises text indicating a Uniform Resource Locator (URL), automatically causing the web browser application to navigate to the URL.

19. The processor-implemented method of claim 1, wherein enabling the user to enter search string text and the control characters into the text entry application comprises:
    providing a toggle button selectable by a user to cause the text entry application to enter and exit a search string mode; and
    designating text entered or selected while in search string mode as search string text, wherein the control characters are entered automatically in response to the user selecting the toggle button.

20. The processor-implemented method of claim 19, wherein the control characters that are entered automatically are hidden from display to the user through the user interface.

21. A computing device providing a user interface, comprising:
    at least one microcontroller,
    a memory,
    wherein the memory is in operative connection with the at least one microcontroller, and includes instructions corresponding to a text entry application,
    a screen,
    wherein the screen is in operative connection with the at least one microcontroller,
    at least one input device,
        wherein the at least one input device
            is in operative connection with the at least one microcontroller,
            is operative to select displayed hyperlinks, and
            is selectively operative to receive input text,
            wherein the input text includes search string text, wherein the search string text comprises any arrangement of user selected characters, and a pair of control characters, wherein one of the pair of control characters designates a start of the search string text, and the other of the pair of control characters designates the end of the search string text,
    wherein the at least one microcontroller is operative to cause receipt of input text into the text entry application responsive to user inputs through the at least one input device, wherein the receipt of input text includes receipt of the search string text bounded by the pair of control characters, responsive at least in part to the receipt of the control characters and the search string text, automatically providing an output through the screen, wherein the output includes a hyperlink including only the search string text, wherein the hyperlink is displayed in place of the characters comprising the search string text and the pair of control characters, responsive at least in part to receipt of at least one input through the at least one input device selecting the hyperlink, causing automatic communication with a web browser application, wherein the web browser application is separate from the text entry application, initiation of a web search based on the search string text, receipt of the web browser application results of the search, and output of at least some of the received web browser application results of the search through the screen.

22. A non-transitory processor-readable medium embodying computer program instructions, wherein the instructions are operative to cause at least one processor of a computing device to carry out steps that provide user interface outputs, comprising:

assigning within a text entry application, at least one keyboard character as a control character, wherein one respective assigned control character respectively designates a start of search string text and another respective assigned control character respectively designates an end of search string text, wherein search string text includes text between the control characters;

receiving into the text entry application through at least one input device, input search string text including user selected and arranged characters disposed between the control characters, responsive at least in part to at least one user input indicating completion of the input search string text between the control characters, automatically providing a screen output through a screen wherein the screen output includes a hyperlink including only the input search string text, wherein the hyperlink is displayed in place of the characters that comprise the input search string text and the assigned control characters, responsive at least in part to receipt of an input corresponding to user selection of the hyperlink including the input search string text, automatically communicating with a separate web browser application outside the text entry application, invoking a web search based on the search string text, receiving results of the search, and visually outputting at least some of the received results of the search through the screen.

* * * * *